Patented July 26, 1927.

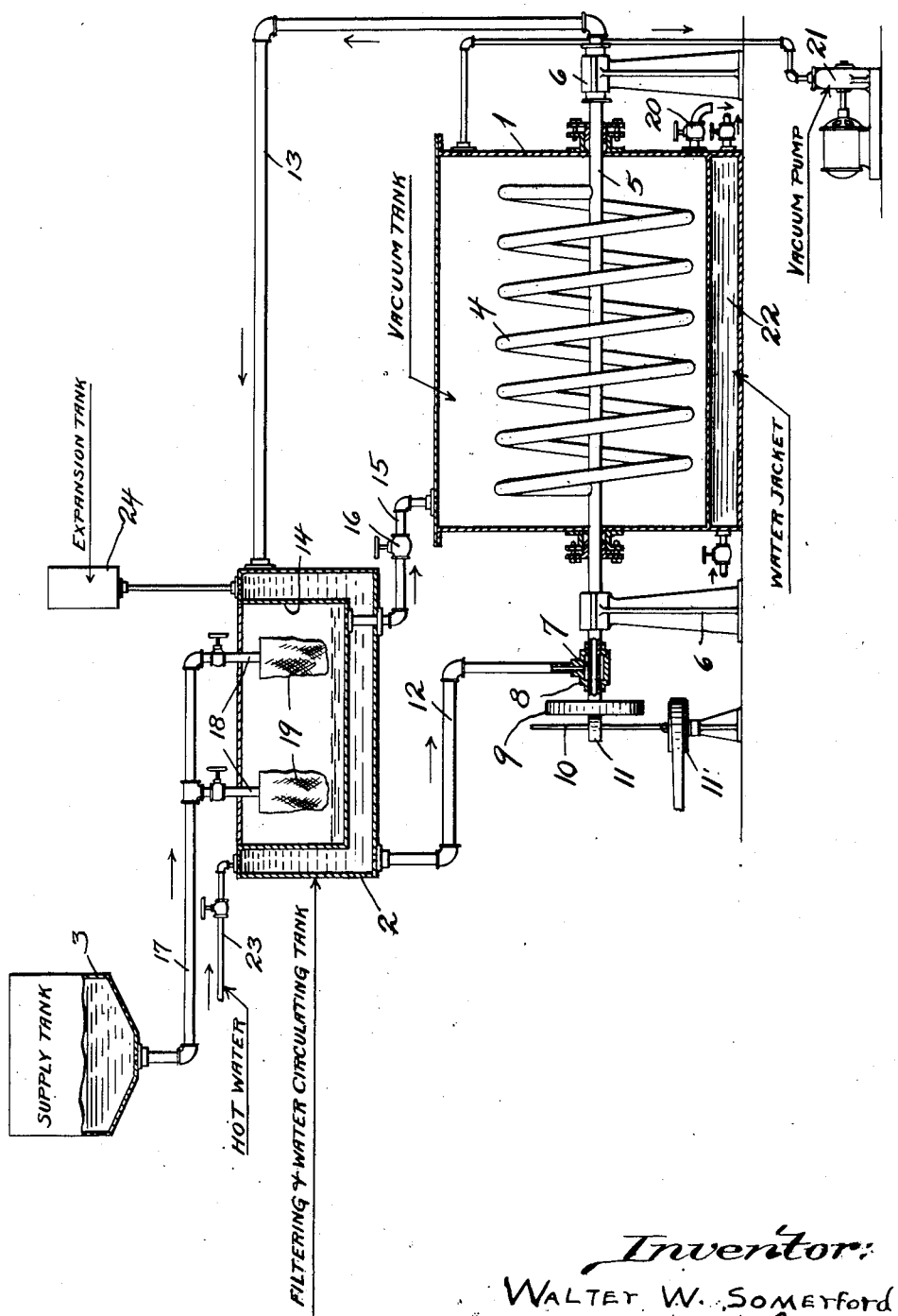

1,636,719

UNITED STATES PATENT OFFICE.

WALTER W. SOMERFORD, OF ROSSLYN, VIRGINIA.

PROCESS FOR REFINING BEE HONEY.

Application filed August 24, 1922. Serial No. 584,027.

The present invention consists of an apparatus and process for refining bee honey.

It is known in apiculture that different grades of honey are produced by honey bees predicated upon the nature of the soil and correspondingly upon the nature of the vegetation produced by the soil. Consequently, certain vegetation is productive of a low grade of honey usually known as "baking honey" while other vegetation is productive of the high grade or "edible honey". The low grade honey is characterized by precisely the same food value as the high grade honey but is not palatable or edible in its natural form because of the impurities, especially acid and resin which are contained therein. This invention consequently aims to provide an apparatus and process which will delete impurities from the low grade honey and bring out the latent bouquet or nectar of the latter while the flavor of high grade honey when refined by the present invention is augmented, besides which any impurities in the so-called high grade honey are removed.

Objects of the invention are: to utilize a process wherein the inferior grades of honey, especially the socalled baking honey, will be relieved of all impurities and transformed into a palatable, edible and nutritious honey without mitigating its food value; to provide a refining process for the better grades of honey, which, in conjunction with deleting any impurities therefrom, likewise augments the palatable flavor of the honey; to employ a process for refining the honey which is inexpensive and may be utilized, with beneficial results, even by a person unskilled in the art.

A co-ordinate object of the invention is to provide an apparatus especially constructed to selectively perform the steps in the honey refining process embodied in the present invention, the apparatus including a novel combination of more or less standard elements organized in a manner which insures effective performance of the process steps, in proper sequence.

The above and other objects of this invention will be apparent from the following description of the present preferred form of the invention taken in connection with the accompanying drawings wherein :—

The view shown in the drawings is a diagrammatical illustration of the apparatus used in filtering, heating and agitating the honey, the supply tank being shown fragmentarily while the filtering and water circulating tank as well as the vacuum tank are shown in vertical section.

The apparatus used in the present invention consists especially of a vacuum tank 1 which has mounted thereabove a combined filtering and water circulating tank 2 and supply tank 3, respectively. The vacuum tank is equipped with a helical coil 4 the ends of which are engaged to and communicate with a pipe 5 which extends axially through the tank 1 acting as a supply pipe for the coil 4 as well as a shaft for rotatably supporting the coil to permit use of the latter as an agitator. The opposite ends of the pipe 5 extend into bearings 6, one end of the pipe being extended beyond one of the bearings 6 and provided with perforations 7 around which a jacket 8 is mounted. The terminal of the pipe, beyond the perforations 7 is equipped with a transmission disk 9 to which a power shaft 10 is operatively connected by means of a pinion 11. The power shaft may be mounted in a universal socket carried by a power pulley 11′ to permit movement of the same toward and away from the disk 9 while the pinion 11 is movable to engage the outer face of the disk at different points for increasing or decreasing the speed of rotation of said disk to correspondingly change the velocity of the agitator. The jacket 8 has a pipe issuing therefrom which communicates with a steam or water inlet pipe 12 the latter being connected with and in communication with the lower end of the water circulating tank 2. The opposite end of the pipe 5, from that which engages the disk 9 terminates in the bearing 6 at the right side of the vacuum tank and is in communication with a water or steam return pipe 13 which latter is engaged to and communicates with the water tank 2 adjacent the top of the latter.

The water circulating tank has a honey filtering tank 14 integrally connected thereto. The outer face of the honey filtering tank is appreciably spaced from the inner faces of the ends, sides and bottom of the water circulating tank to provide a water jacket which encases the honey filtering tank to heat the latter. The honey filtering tank is in communication with the vacuum tank by means of a pipe 15 the latter having a valve 16 mounted therein through the medium of which communication may be cut off between the honey filtering tank and vacuum tank at any time desired.

The lower end of the supply tank 3 preferably tapers to provide a truncated cone shaped end in order to prevent the accumulation of honey or filtering material at the bottom of the tank. The bottom of the tank has a honey conducting pipe 17 in communication therewith the latter being equipped with one or more valved tributaries 18 the lower ends of which carry filter bags 19. The filter bags may be made of any desired filtering material and are by preference completely housed within the tank 14 to insure thorough heating of the same. The honey after passing through the pipe 15 gravitates into the vacuum tank 1 from which it may be dispensed through a faucet 20. The vacuum tank is in connection with a vacuum pump 21 the latter being of standard construction and employed to maintain a vacuum or partial vacuum in the tank at all times. Moreover if desired the bottom of the vacuum tank may be equipped with a water jacket 22 to additionally heat the same.

Hot water is introduced into the water circulating tank 2 through an inlet pipe 23 and if desired the water tank may be equipped with an expansion tank, as shown at 24, which likewise may be of standard construction.

In employing a process embodying the present invention, a supply of the natural honey with water added and a filtering material is first deposited in the supply tank 3 where the honey and filtering material, such as charcoal are permitted to be mingled. In this way, the honey is first filtered by chemical means following which the filtered mass is permitted to gravitate through the pipe 17 and into the filter bags 19. By this step in the process the chemically filtered mass of honey is mechanically filtered and seeps through said bags into the honey filtering tank 14. The tank 14 is maintained at a constant heat through the medium of the hot water passing through the water circulating tank. The mechanically filtered honey gravitates through the pipe 15 and into the vacuum tank 1. The hot water or steam which flows through the pipe 12 is injected through the perforations 7 so as to force the same through the coil 4, the latter being simultaneously rotated by rotation of the power disk 9.

Consequently, the honey passing into the vacuum tank, is contemporaneously heated and agitated. When the mass of honey in the vacuum tank is reduced to the proper consistency, which may be 80% solids and 20% water the honey is drawn off through the faucet 20, blended, if desired, and bottled or packaged in any suitable manner.

From the above it is apparent that the honey is filtered by a simple inexpensive process yet one which has been found to be very effective for attaining the objects of this invention as herein recited. The combination of chemically and mechanically filtering the honey taken in conjunction with the heating and agitation thereof at predetermined intervals will not only delete impurities from the honey but will furthermore maintain the pure bouquet of the honey and augment the flavor or palatable nectar thereof. The apparatus and process may be used either with the so-called baking honey or with the socalled high grade honey but perhaps the best results will be obtained by introducing into the supply tank a relatively small proportion of the so-called high grade honey with a relatively large proportion of the low grade honey which will produce a resultant filtered mass positively free from all impurities yet characterized by at least the same food value and palatable properties of any of the high grade honeys now obtained.

What is claimed is:—

1. A process for refining bee honey consisting of first mixing the natural honey with a filtering substance and water and then running the mass through filter bags in the presence of heat, after which the filtered mass is introduced into a vacuum tank and stirred by a heated agitator until the mass attains a predetermined consistency at which time the vacuum is relieved and the honey withdrawn from the tank.

2. A process for refining bee honey consisting of mingling the honey, charcoal and water, and then filtering the mass through filter bags into a water heated tank from which the mass is dispensed into a vacuum chamber and agitated during the presence of heat until the honey attains a consistency of approximately 80% solids and 20% liquids followed by removal of the honey from the vacuum chamber.

In testimony whereof I affix my signature.

WALTER W. SOMERFORD.